United States Patent
Frazier (10) Patent No.: US 10,017,125 B2
(45) Date of Patent: Jul. 10, 2018

(54) PORTABLE APPARATUSES FOR MOUNTING A PERSONAL ELECTRONIC DEVICE AND METHODS FOR USE THEREOF

(71) Applicant: Sean Frazier, High Point, NC (US)

(72) Inventor: Sean Frazier, High Point, NC (US)

( * ) Notice: Subject to any disclaimer, the term of this patent is extended or adjusted under 35 U.S.C. 154(b) by 60 days.

(21) Appl. No.: 15/331,985

(22) Filed: Oct. 24, 2016

(65) Prior Publication Data
US 2018/0111567 A1 Apr. 26, 2018

(51) Int. Cl.
*B60R 7/00* (2006.01)
*B60R 11/02* (2006.01)
*B60R 11/00* (2006.01)

(52) U.S. Cl.
CPC .......... *B60R 11/02* (2013.01); *B60R 11/0241* (2013.01); *B60R 11/0252* (2013.01); *B60R 2011/0017* (2013.01); *B60R 2011/0059* (2013.01); *B60R 2011/0064* (2013.01)

(58) Field of Classification Search
CPC . B60R 11/02; B60R 11/0241; B60R 11/0252; B60R 2011/0064; B60R 2011/0017; B60R 2011/0059
USPC ........................................................ 224/275
See application file for complete search history.

(56) References Cited

U.S. PATENT DOCUMENTS

| | | | | |
|---|---|---|---|---|
| 5,056,696 A * | 10/1991 | Lahr | .......................... | A45F 5/02 224/148.4 |
| 5,285,940 A * | 2/1994 | Goulter | ..................... | A45F 5/00 108/43 |
| 5,325,991 A * | 7/1994 | Williams | .................. | A45F 5/02 215/12.1 |
| 6,685,016 B2 | 2/2004 | Swaim et al. | | |
| 7,533,860 B2 * | 5/2009 | Somuah | ................. | B60N 3/102 206/217 |
| 7,637,404 B1 * | 12/2009 | Stepanova | ............. | B60R 7/085 224/275 |
| 7,861,985 B2 | 1/2011 | Galvin | | |

(Continued)

FOREIGN PATENT DOCUMENTS

| CN | 104266042 A | 1/2015 |
|---|---|---|
| CN | 204512852 U | 7/2015 |

(Continued)

OTHER PUBLICATIONS

Aleratec: "Aleratec Headrest Mount Swivel Rear Seat Car Holder for Tablets From 7-10in", Amazon, Jul. 22, 2013, available on https://www.amazon.com/Aleratec-Headrest-Swivel-Holder-Tablets/dp/B00E3EVXVY.

(Continued)

*Primary Examiner* — Nathan J Newhouse
*Assistant Examiner* — Lester L Vanterpool
(74) *Attorney, Agent, or Firm* — Forrest Firm, P.C.

(57) ABSTRACT

A portable personal electronic device mounting apparatus is provided. The apparatus includes a vertical strip comprised of vertical fasteners, a support bracket attached to a bottom portion of the vertical strip. In this embodiment, the support bracket is configured to receive a personal electronic device. The apparatus further includes a first support strap comprised of first strap fasteners and two ends. Each of the two ends is selectively fastenable to each other and at least one of the two ends is selectively fastenable in relation to the vertical strip.

15 Claims, 6 Drawing Sheets

(56) References Cited

U.S. PATENT DOCUMENTS

| | | | |
|---|---|---|---|
| 8,376,200 B2* | 2/2013 | Kim | B60R 11/00 224/275 |
| 9,375,073 B2* | 6/2016 | Orr, Jr. | A45F 5/00 |
| 2005/0236447 A1 | 10/2005 | Monivis | |
| 2010/0288900 A1 | 11/2010 | Janik | |
| 2011/0057002 A1* | 3/2011 | Westra | A45F 5/10 224/218 |
| 2015/0021369 A1* | 1/2015 | Lehtonen | B60R 7/043 224/275 |
| 2015/0108798 A1 | 4/2015 | Boyer, Jr. | |
| 2015/0115009 A1* | 4/2015 | Stauber | B60R 11/02 224/275 |
| 2015/0123433 A1 | 5/2015 | Lamb, Jr. et al. | |
| 2015/0144754 A1* | 5/2015 | Elharar | B60R 11/0241 248/230.8 |
| 2015/0335137 A1* | 11/2015 | Perry | A45F 5/00 224/218 |

FOREIGN PATENT DOCUMENTS

| | | |
|---|---|---|
| JP | 2008037162 A | 2/2008 |
| WO | 2012018405 A2 | 2/2012 |
| WO | 2015013661 A1 | 1/2015 |

OTHER PUBLICATIONS

Orzly: "Apple iPad 2, iPad 3, & iPad 4 BLACK Dual In-Car Headrest Holder & Flip Case Cover", Amazon, Sep. 22, 2010, available on https://www.amazon.co.uk/Apple-BLACK-Headrest-Holder-Cover/dp/B00J4VB3Y8.

Vonhaus: "Vonhaus Tablet Computer Car Headrest Mount Holder for iPad Kindle Nexus Android", ebay, Oct. 16, 2016, available on http://www.ebay.co.uk/itm/Vonhaus-Tablet-Computer-Car-Headrest-Mount-Holder-for-iPad-Kindle-Nexus-Android-/272237787873.

Costech: "Tablet Holder, Costech® Heavy Duty Metal Flexible Long Arm Stand 360-degree Rotating Clip-on Mount for Ipad Mini, Ipad Air, Samsung Tablet (White)", Amazon, Nov. 2015, available on https://www.amazon.com/dp/B015TN5FZ2?_encoding=UTF8 &ref_=de_a_smtd&showDetailTechData=1#technical-data.

Imagination Productions: "2015 Premium High Quality Heavy Duty Car Headrest & Airplane Tray Table Mount Holder for 9" Portable DVD players", Amazon, Jan. 8, 2014, available on https://www.amazon.com/Premium-Quality-Headrest-Airplane-Portable/dp/B00HO0FYEQ.

* cited by examiner

PORTABLE APPARATUSES FOR MOUNTING A PERSONAL ELECTRONIC DEVICE AND METHODS FOR USE THEREOF

TECHNICAL FIELD

The present technology relates generally to portable apparatuses for mounting personal electronic devices and methods for use thereof. Particular embodiments are directed to apparatuses for mounting personal electronic devices such as tablets and smartphones to airplane or other vehicle seats.

BACKGROUND

With the proliferation of personal electronic devices such as laptop computers, tablets, smartphones, e-readers, and handheld gaming devices over the past several years, the use of such devices on passenger vehicles such as airplanes, trains, buses, and cars for both entertainment and work has become ubiquitous. Modern personal electronic devices commonly include large, high-resolution, touch-sensitive displays for viewing video content, playing games, reading e-books, or viewing or interacting with other content. A common problem with personal electronic devices is that they are uncomfortable to use for long periods of time. Looking down at a personal electronic device resting in or near the lap, keeps comfortable, but causes neck discomfort. Raising the personal electronic device to eye-level for a prolonged period of time prevents neck discomfort, but causes discomfort in the shoulders and arms.

Although several devices in the marketplace allow personal electronic devices to be used in a hands-free manner in a passenger vehicle, they are not compact enough for limited environments such as airplanes, require specialized components to be semi-permanently installed in the seats, or cannot accommodate personal electronic devices of varying shapes and sizes. There remains a need for a simple, portable personal electronic device mounting apparatus that can accommodate personal electronic device of varying sizes.

SUMMARY OF THE INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to at least one embodiment, a portable personal electronic device mounting apparatus is provided. The apparatus may include a vertical strip comprised of vertical fasteners and a support bracket attached to the bottom portion of the vertical strip configured to receive a personal electronic device. The apparatus may further include a first support strap comprised of first strap fasteners and two ends. Each of the two ends may be selectively fastenable to each other and at least one of the two ends may be selectively fastenable in relation to the vertical strip.

According to at least another embodiment of the present invention, a portable personal electronic device mounting apparatus is provided. The apparatus may include a vertical strip and a first support bracket attached to a bottom portion of the vertical strip configured to receive a personal electronic device. The apparatus may further include a second support bracket selectively fastenable to the vertical strip and configured to receive the personal electronic device.

According to another embodiment, the present invention may further include a head rest attachment. The headrest attachment may include a contact pad comprised of contact fasteners and selectively fastenable to the vertical strip and a second support strap comprised of second strap fasteners and two ends. Each of the two ends may be selectively fastenable to the contact pad.

According to another embodiment, the vertical strip, first support strap, contact pad, and second support strap of the present invention may be comprised of self-fastening material.

According to another embodiment, the support bracket of the present invention may comprise a back panel attached to the vertical strip and a front panel connected to the back panel such that the bottom of the front panel is closer to the back panel than the top of the front panel.

According to another embodiment, the front panel of the present invention may be connected to the back panel with a support panel having first circuits and first connectors for receiving an electronic signal and second circuits and second connectors for outputting an electronic signal.

According to another embodiment, the front panel of the present invention may be connected to the back panel with a support panel having a slot for passing a connector through the support panel.

According to another embodiment, the inner faces of the back panel and front panel of the present invention may be comprised of material with a high coefficient of friction.

According to another embodiment, the inner surface of the front panel of the present invention may be terraced such that the support bracket receives a personal electronic device of different thickness on each terrace level.

According to another embodiment, the vertical strip of the present invention may include a slot for hanging the mounting apparatus.

According to at least another embodiment of the present invention, a method for mounting a personal electronic device to the seatback of a passenger vehicle is provided. The method may include fastening a first end of a first support strap to a vertical strip using first strap fasteners, wherein the first support strap is positioned to secure a top portion of the personal electronic device. The method may further include placing a bottom portion of the personal electronic device into a support bracket, wherein the support bracket is attached to the bottom of the vertical strip. The method may further include fastening the second end of the first support strap to one of the vertical strip or first support strap using first strap fasteners and fastening the vertical strip to a top portion of the seatback using vertical fasteners.

According to another embodiment, the method may further include fastening a contact pad to an upper portion of the vertical strip, fastening a first end of a second support strap to the contact pad using second strap fasteners, wrapping the second support strap around a top portion of the seatback, and fastening a second end of the second support strap to the contact pad using second strap fasteners.

According to another embodiment, the method may further include guiding a raised feature of the seatback through a slot in the vertical strip and hanging the vertical strip on the raised feature.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

Figure 1:
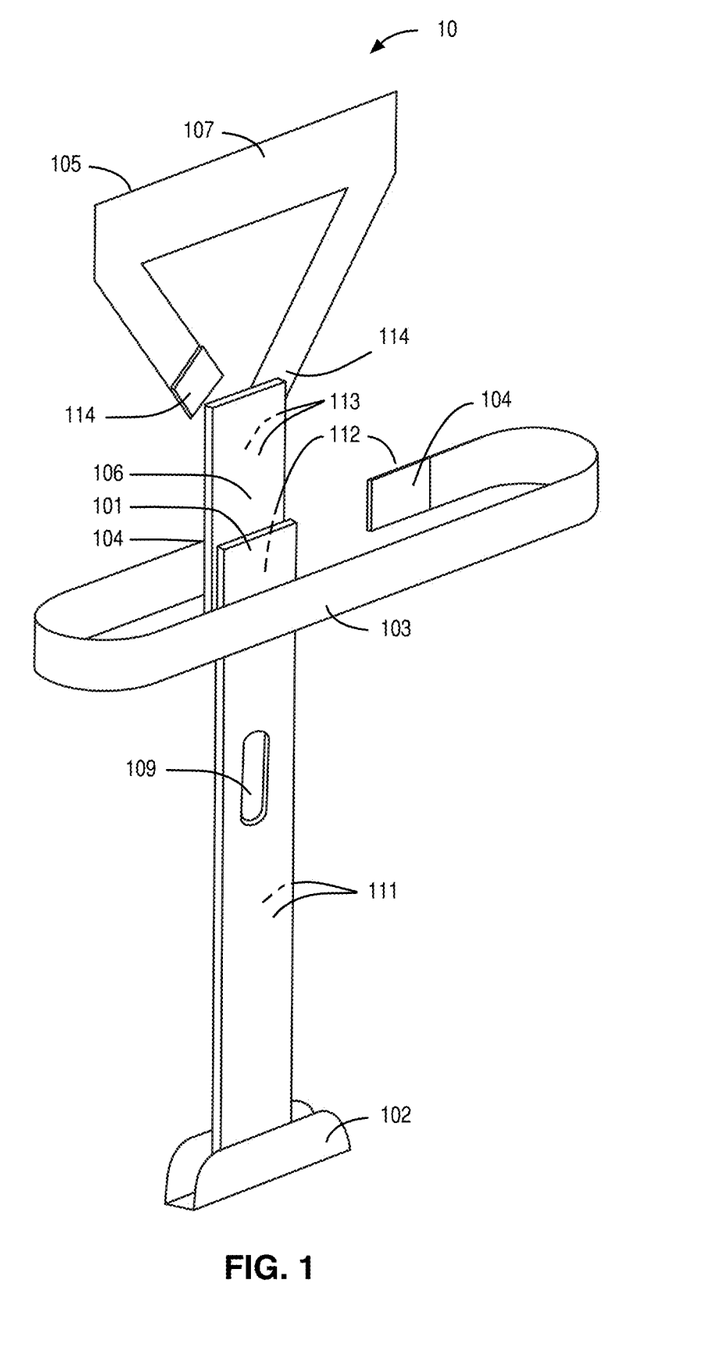
FIG. 1 is an isometric illustration of a portable personal electronic device mounting apparatus according to at least one embodiment of the present invention.

Referring now to FIG. 1, a portable personal electronic device mounting apparatus 10 according to at least one embodiment of the present invention is shown. The apparatus 10 may be comprised of vertical strip 100, which may be comprised of vertical fasteners 111. Support bracket 102 may be attached to a bottom portion of the vertical strip 100 and may be configured to receive a personal electronic device 1. A first support strap 103 may be comprised of first strap fasteners 104 and two ends 112. Each of the two ends 112 may be selectively fastenable to each other and at least one of the two ends 112 may be selectively fastenable in relation to the vertical strip 100. A headrest attachment 105 can be attached to the vertical strip 100 at an upper portion of the vertical strap 101. The headrest attachment 105 may be comprised of contact pad 106 comprised of contact fasteners 113 and may be selectively fastenable to the vertical strip 100. A second support strap 107 may be comprised of second strap fasteners 108 and two ends 114. Each of the two ends 108 may be selectively fastenable to the contact pad 106. In at least one embodiment of the invention, at least one of the two ends 114 is permanently attached to the contact pad 106.

One end of a personal electronic device 1 may be placed in the support bracket 102. The other end of the personal electronic device 1 is secures against the vertical strip with the first support strap 103. The position of the first support strap 103 in relation to the vertical strip 100 may be adjusted depending on the height of the personal electronic device 1 by fastening the ends of the first support strap 103 to the vertical strip 100 at an appropriate position. Thus, the apparatus 10 can accommodate personal electronic devices 1 of varying shapes and sizes.

Figures 5A, 5B:
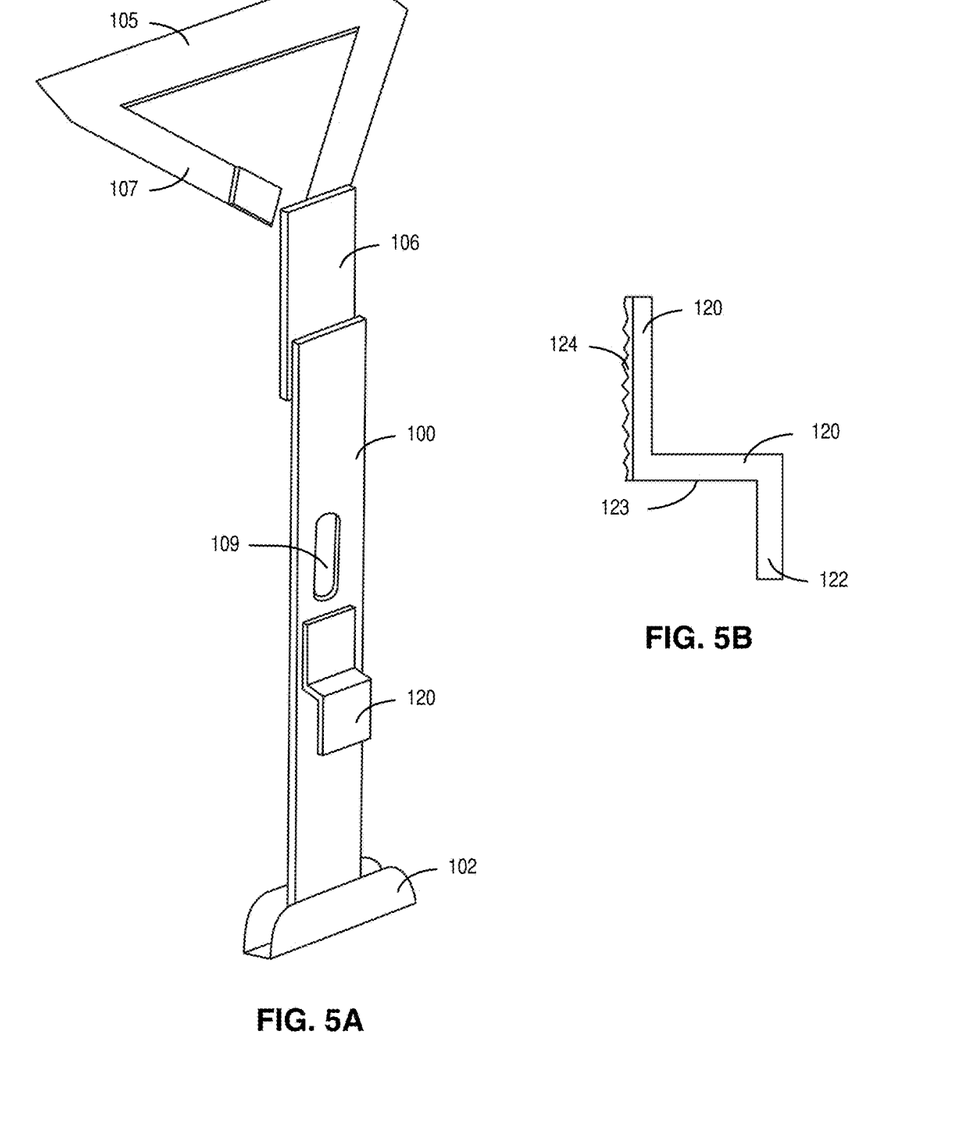
FIG. 5A is an isometric illustration of a portable personal electronic device mounting apparatus according to at least one embodiment of the present invention.
FIG. 5B is a side view of a second support bracket according to at least one embodiment of the present invention.

Referring now to FIGS. 5A and 5B, a portable personal electronic device mounting apparatus 10 according to at least another embodiment of the present invention is shown. The apparatus 10 may be comprised of vertical strip 100, a first support bracket 102 attached to a bottom portion of the vertical strip 100 configured to receive a personal electronic device 1, and a second support bracket 120 selectively fastenable to the vertical strip 100 configured to receive the personal electronic device 1. A headrest attachment 105 comprised of a contact pad 106 selectively fastenable to the vertical strip 100 and a support strap 107, wherein each end of the support strap 107 may be selectively fastenable to the contact pad 106 may be attached to the vertical strip 100. In at least one embodiment of the invention, at least one of the two ends is permanently attached to the contact pad 106.

In some embodiments, the vertical strip 100 may also include a slot 109 for hanging the mounting apparatus 10. The region of the vertical strip 100 around the slot 109 may be reinforced with stiff materials such as nylon, plastic, or other lightweight polymers Second support bracket 120 may be comprised of two planks 121, 122 extending in opposite directions connected by a third plank 123. One or both of the two planks 121, 122 may be comprised of plank fasteners 124 that may be fastened to the vertical strip 100 at different positions to accommodate personal electronic devices 1 of varying size. With the second support bracket 120 properly adjusted on the vertical strip 100 to accommodate a particular personal electronic device 1, the user may secure the personal electronic device 1 to the apparatus 10 by sliding the personal electronic device 1 sideways in between the first support bracket 102 and second support bracket 120.

In preferred embodiments, the vertical fasteners 111, first strap fasteners 104, contact fasteners 113, second strap fasteners 108, and plank fasteners 124 may be comprised of self-fastening material such as hook-and-loop fasteners (e.g., VELCRO® brand). One of ordinary skill in the art, however, will appreciate that the various embodiments of the present invention may be implemented with other fasteners known in the art including, but not limited to, buttons, clasps, hooks, buckles, clamps, and clips.

Airplane seats in many commercial airline fleets include integrated patches of hook-and-loop fasteners near the top of the seatback for attaching headrest covers. In airplane seats equipped with such integrated fasteners, the apparatus 10 can be fastened directly to the seatback of the airplane using the vertical fasteners 111 of the vertical strip 100. In airplane seats or seats in other passenger vehicles without integrated fasteners, the headrest attachment 105 may be attached to the vertical strip 103 using the contact fasteners 113 of the contact pad 106. The headrest attachment 105 may be used to secure the apparatus 10 to the seatback as described in further detail herein.

Figure 2A:
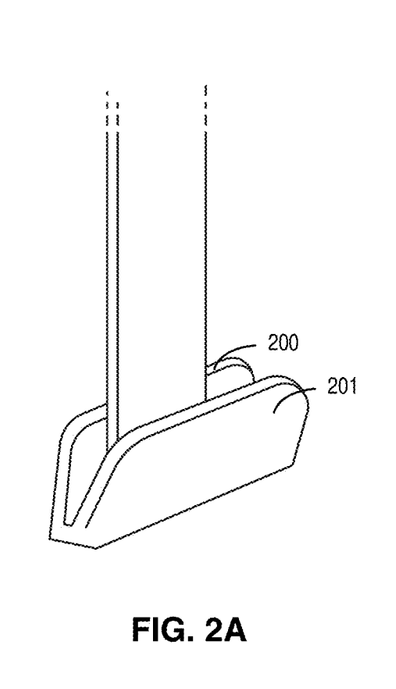
FIG. 2A is an isometric illustration of a bottom portion of a vertical strip and first support bracket according to at least one embodiment of the present invention.
Figure 2B:
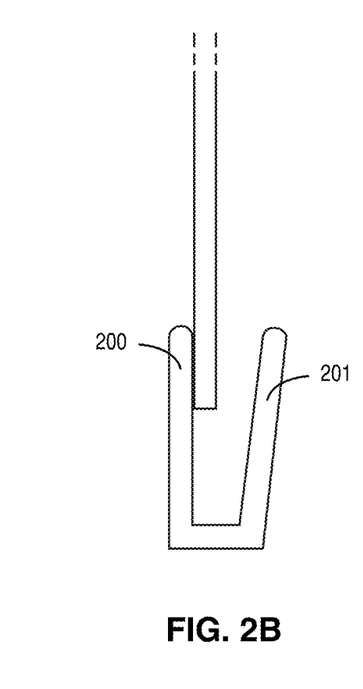
FIG. 2B is a side view of a bottom portion of a vertical strip and first support bracket according to at least one embodiment of the present invention.

Referring now to FIGS. 2A and 2B, a support bracket 102 according to at least one embodiment of the present invention is shown. The support bracket 102 may be comprised of a back panel 200 attached to the vertical strip 103 and a front panel 201 connected to the back panel 200 such that the bottom of the front panel 201 is closer to the back panel 200 than the top of the front panel 201. The angle of the front panel 201 relative to the back panel 200 ensures that the support bracket 102 can accommodate personal electronic devices 1 of varying thicknesses. In preferred embodiments, the support bracket 102 may be a single piece of extruded plastic and the back panel 200 may be riveted to the vertical strip 100.

Figure 3A:
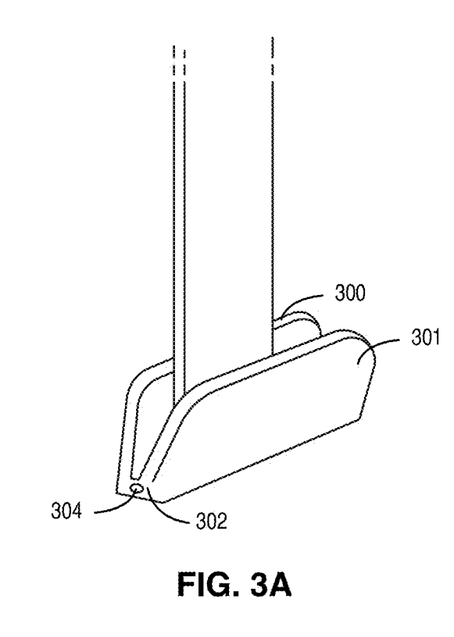
FIG. 3A is an isometric view of a bottom portion of a vertical strip and first support bracket according to at least one embodiment of the present invention.
Figure 3B:
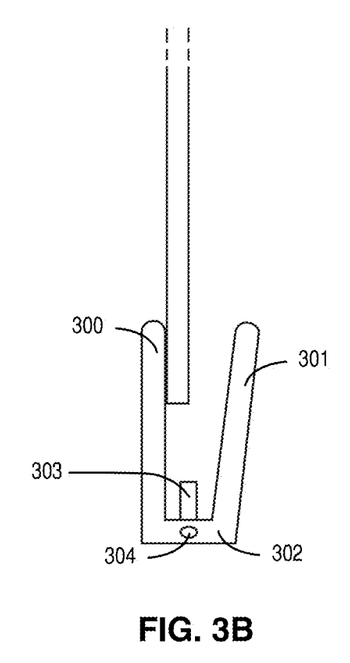
FIG. 3B is a side view of a bottom portion of a vertical strip and first support bracket according to at least one embodiment of the present invention.

Referring now to FIGS. 3A and 3B, a support bracket 102 according to at least one embodiment of the present invention is shown. The front panel 301 may be connected to back panel 300 with a support panel 302 having first circuits and first connectors 303 for receiving an electronic signal and second circuits and second connectors 304 for outputting an electronic signal. The second circuits and second connectors 304 may be comprised of input ports and may be integrated into the side or the bottom of the support panel 303. The personal electronic device 1 may be placed in the support bracket 102 such that the first circuits and first connectors 303 are inserted into a compatible input port in the personal electronic device 1. The user may connect power sources or other peripheral devices to the personal electronic device 1 using the second circuits and second connectors 304. Exemplary connectors and compatible input ports may include, but are not limited to, USB 1.1, USB 2.0, USB 3.0, USB Type-C, IEEE 1394, Lightning®, 3.5 mm audio jack, 2.5 mm audio jack.

In yet another embodiment, a support bracket 102 may be comprised of a front panel 301 connected to a back panel 300 with a support panel 302 having a slot for passing a connector through the support panel 302.

Figure 4A:
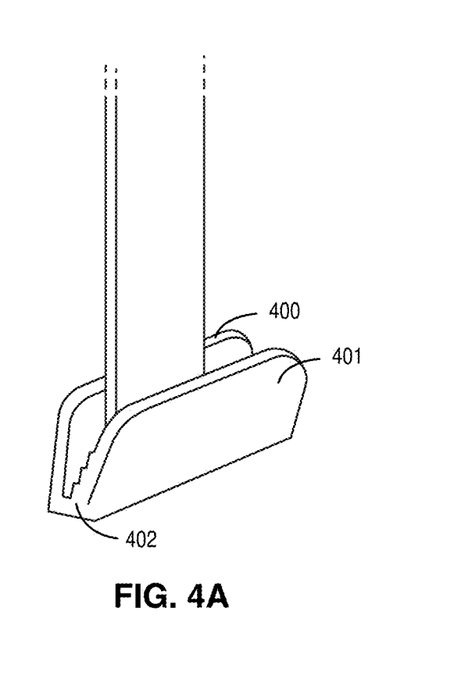
FIG. 4A is an isometric view of a bottom portion of a vertical strip and first support bracket according to at least one embodiment of the present invention.
Figure 4B:
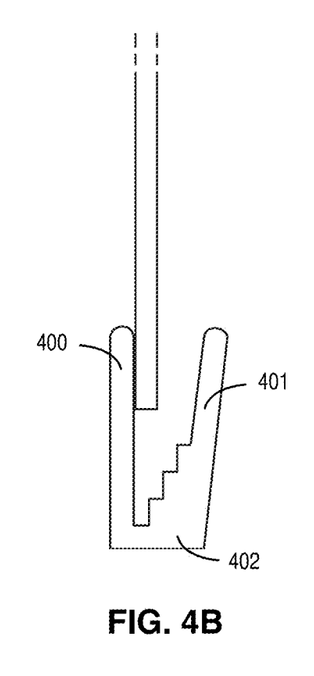
FIG. 4B is a side view of a bottom portion of a vertical strip and first support bracket according to at least one embodiment of the present invention.
Figure 4C:
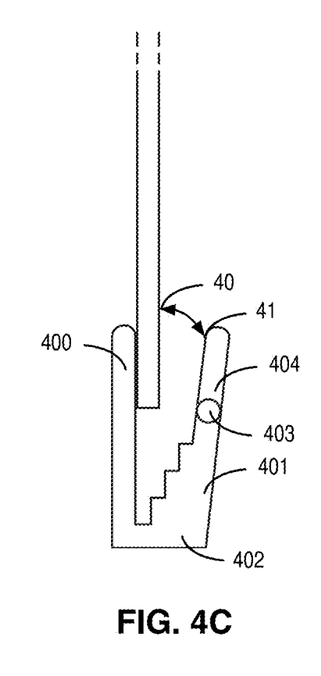
FIG. 4C is a side view of a bottom portion of a vertical strip and first support bracket with rotating panel according to at least one embodiment of the present invention.

Referring now to FIGS. 4A and 4B, a support bracket 102 according to at least one embodiment of the present invention is shown. The inner surface of the front panel 401 may be terraced such that the support bracket 102 receives a personal electronic device 1 of different thickness on each terrace level 402. Referring now to FIG. 4C, in yet another embodiment of support bracket 102, front panel 401 may be comprised of terrace level 402 and rotating panel 404 connected by a joint 403. The joint 403 may be comprised of a spring or similar mechanism having a spring constant which exerts a force towards the back panel 400. In closed position 40, the top of the rotating panel 404 pushes against the back panel 400. The user may insert the personal electronic device 1 into the support bracket 102 by pulling the top of the rotating panel 404 to the open position 41. Once the personal electronic device 1 is inserted into the support bracket 102, the user may release the rotating panel 404 and the top of the rotating panel 404 will return to the closed position 40.

The inner faces of the back panels 200, 300, 400 and/or front panels 201, 301, 401 of the support bracket 102 may also be comprised of materials with a high coefficient of friction 305, for example, rubber, foam, textured plastic, silicone, and high-grip textiles or engineered materials known in the art. In some embodiments, a layer of high coefficient material 305 is included on the back panels 200, 300, 400 and/or front panels 201, 301, 401.

Figure 6A:
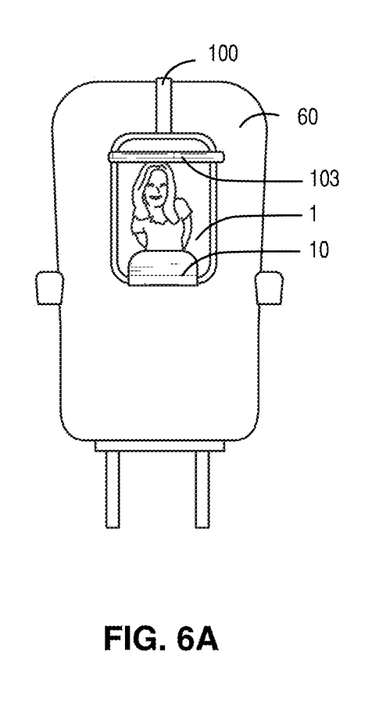
FIG. 6A is an isometric view of a portable personal electronic device mounting apparatus according to at least one embodiment of the present invention fastened to a seatback of a passenger vehicle.

Referring now to FIG. 6A, an illustration of the apparatus 10 in use is shown. According to at least one embodiment of the present invention, a method for mounting a personal electronic device 1 to the seatback 60 of a passenger vehicle may include fastening a first end of a first support strap 103 to a vertical strip 100 using first strap fasteners 104, wherein the first support strap 103 is positioned to secure a top portion of the personal electronic device 1. The step may further include placing a bottom portion of the personal electronic device 1 into a support bracket 102, wherein the support bracket 102 is attached to a bottom portion of the vertical strip 100. The method may further include wrapping the first support strap 103 around a top of the personal electronic device 1, fastening the second end of the first support strap 103 to one of the vertical strip 100 or first support strap 103 using first strap fasteners 104, and fastening the vertical strip 100 to a top portion of the seatback using vertical fasteners 111.

Figure 6B:
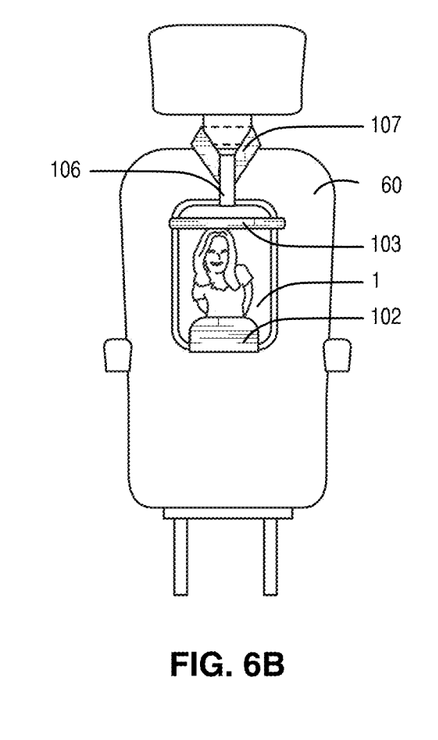
FIG. 6B is an isometric view of a portable personal electronic device mounting apparatus according to at least one embodiment of the present invention fastened to a seatback of a passenger vehicle.

Referring now to FIG. 6B, the method of mounting a personal electronic device 1 may further include fastening a contact pad 106 to an upper portion of the vertical strip 100, fastening a first end of a second support strap 107 to the contact pad 106 using second strap fasteners 108, wrapping the second support strap 107 around a top portion of the seatback 60, and fastening a second end of the second support strap 107 to the contact pad 106 using second strap fasteners 108. In yet another embodiment, the method may include fastening a contact pad 106 to an upper portion of the vertical strip 100, wherein the first end of a second support strap 107 is permanently attached to the contact pad 106. The method may further include wrapping the second support strap 107 around a top portion of the seatback 60 and fastening a second end of the second support strap 107 to the contact pad 106 using second strap fasteners 108.

The apparatus can accommodate personal electronic devices 1 of varying sizes by fastening the first end of the first support strap 103 to the vertical strip 100 at varying positions. For example, once the personal electronic device 1 is placed in the support bracket 102, the first end of the first support strap 103 can be attached to the vertical strip 100 at a position where the first support strap 103 covers the top bezel of the personal electronic device 1, but does not cover the display.

Once the personal electronic device 1 is secured in the apparatus 10 between the support bracket 102 and the first support strap 103. In seats with integrated fasteners, for example, airplane seats with integrated patches of hook-and-loop fasteners, the vertical strip 100 can be fastened directly to the seatback 60. In seats without integrated fasteners, the contact pad 106 and second support strap 107 may be used to secure the apparatus 10 to the seatback 60. Alternatively, the contact pad 106 and second support strap 107 may be used in combination with the vertical strip 100 and seatback 60 integrated fasteners to further secure the apparatus 10.

In yet another embodiment, the method may further include guiding a raised feature of the seatback 60 through a slot 109 in the vertical strip 100 and hanging the vertical strip 100 on the raised feature. Airplane seats commonly integrate a fold-down food tray that is held securely against the seatback 60 with a latch. The latch is commonly raised in relation to the seatback 60. The slot 109 in the vertical strip 600 can allow the latch to pass through the slot 109 such that the vertical strip 100 lies flush against the seatback 60 and the vertical strip 100 partially hangs from the latch.

Many changes and modification could be made to the invention without departing from the spirit thereof. The scope of these changes will become apparent from the appended claims.

The invention claimed is:

1. A portable personal electronic device mounting apparatus comprising:
   a vertical strip comprised of vertical fasteners;
   a support bracket attached to a bottom portion of the vertical strip configured to receive a personal electronic device, wherein the support bracket includes:
       a back panel attached to the vertical strip; and
       a front panel connected to the back panel such that the bottom of the front panel is closer to the back panel than the top of the front panel;
   a first support strap comprised of first strap fasteners and two ends, each of the two ends selectively fastenable to each other and at least one of the two ends is selectively fastenable in relation to the vertical strip;
   wherein the front panel is connected to the back panel with a support panel having first circuits and first connectors for receiving an electronic signal and second circuits and second connectors for outputting an electronic signal.

2. The portable personal electronic device mounting apparatus of claim 1, further comprising:
   a headrest attachment comprising:
       a contact pad comprised of contact fasteners and selectively fastenable to the vertical strip;
       a second support strap comprised of second strap fasteners and two ends, each of the two ends selectively fastenable to the contact pad.

3. The portable electronic device mounting apparatus of claim 2, wherein the vertical fasteners, first strap fasteners, contact fasteners, and second strap fasteners are comprised of self-fastening material.

4. The portable personal electronic device mounting apparatus of claim 1, wherein the inner face of the back panel and or front panel includes materials with a high coefficient of friction thereon.

5. The portable personal electronic device mounting apparatus of claim 1, wherein the inner surface of the front panel is terraced such that the support bracket receives a personal electronic device of different thickness on each terrace level.

6. The portable personal electronic device mounting apparatus of claim 1, wherein the vertical strip includes a slot for hanging the mounting apparatus.

7. A portable electronic device mounting apparatus comprising:
   a vertical strip;
   a first support bracket attached to a bottom portion of the vertical strip configured to receive a personal electronic device;
   a second support bracket selectively fastenable to the vertical strip and configured to receive the personal electronic device, wherein the second support bracket comprises:
       a back panel attached to the vertical strip;
       a front panel connected to the back panel such that the bottom of the front panel is closer to the back panel than the top of the front panel,
       wherein the front panel is connected to the back panel with a support panel having first circuits and first connectors for receiving an electronic signal and second circuits and second connectors for outputting an electronic signal.

8. The portable electronic device mounting apparatus of claim 7, further comprising:
   a headrest attachment comprising:
       a contact pad selectively fastenable to the vertical strip;
       a support strap, wherein each end of the support strap is selectively fastenable to the contact pad.

9. The portable electronic device mounting apparatus of claim 7, wherein the vertical strip includes a slot for hanging the mounting apparatus.

10. The portable electronic device mounting apparatus of claim 9, wherein the inner face of the back panel and/or front panel include materials with a high coefficient of friction thereon.

11. The portable electronic device mounting apparatus of claim 9, wherein the inner surface of the front panel is terraced such that the support bracket receives a personal electronic device of different thickness on each terrace level.

12. A method for mounting a personal electronic device to the seatback of a passenger vehicle comprising:
   fastening a first end of a first support strap to a vertical strip using first strap fasteners, wherein the first support strap is positioned to secure a top portion of the personal electronic device;
   placing a bottom portion of the personal electronic device into a support bracket, wherein the support bracket is attached to a bottom portion of the vertical strip, wherein the second support bracket comprises:
   a back panel attached to the vertical strip;
   a front panel connected to the back panel such that the bottom of the front panel is closer to the back panel than the top of the front panel,
       wherein the front panel is connected to the back panel with a support panel having first circuits and first connectors for receiving an electronic signal and second circuits and second connectors for outputting an electronic signal;
   wrapping the first support strap around a top portion of the personal electronic device;
   fastening the second end of the first support strap to one of the vertical strip or first support strap using first strap fasteners; and
   fastening the vertical strip to a top portion of the seatback using vertical fasteners.

13. The method of claim 12, further comprising:
fastening a contact pad to an upper portion of the vertical strip;
fastening a first end of a second support strap to the contact pad using second strap fasteners;
wrapping the second support strap around a top portion of the seatback; and
fastening a second end of the second support strap to the contact pad using second strap fasteners.

14. The method of claim 12, further comprising:
fastening a contact pad to an upper portion of the vertical strip, wherein the first end of a second support strap is permanently attached to the contact pad;
wrapping the second support strap around a top portion of the seatback; and
fastening a second end of the second support strap to the contact pad using second strap fasteners.

15. The method of claim 12, further comprising:
hanging the vertical strip using a slot positioned within the vertical strip.

\* \* \* \* \*